Sept. 25, 1956   R. H. ANDERSON ET AL   2,764,373
HEATED VORTEX GENERATOR
Filed May 18, 1953
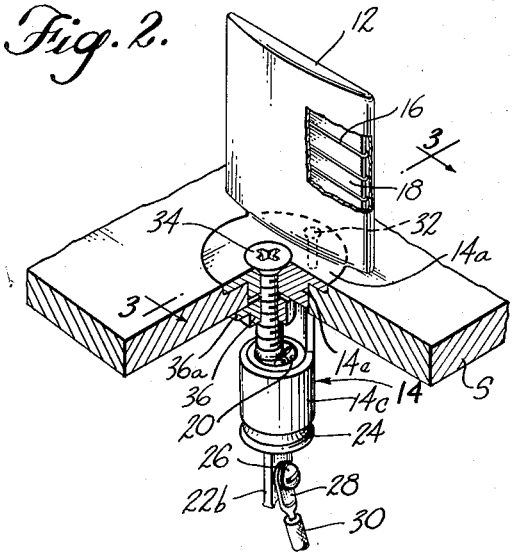
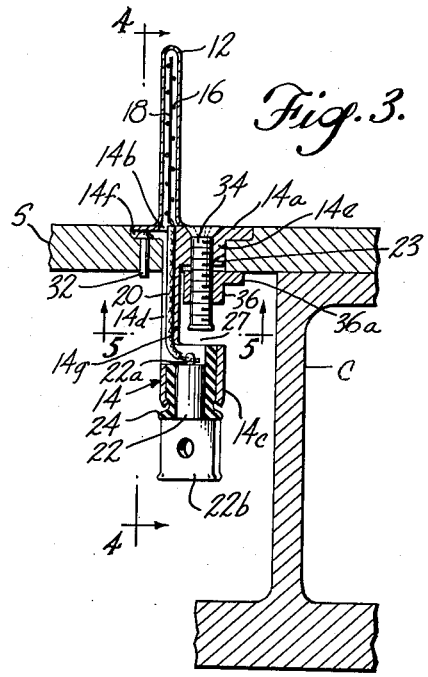
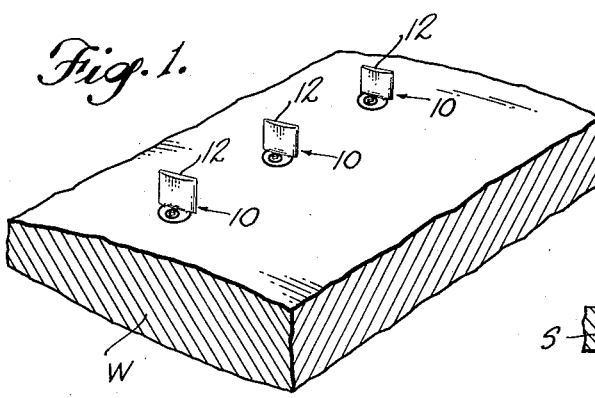
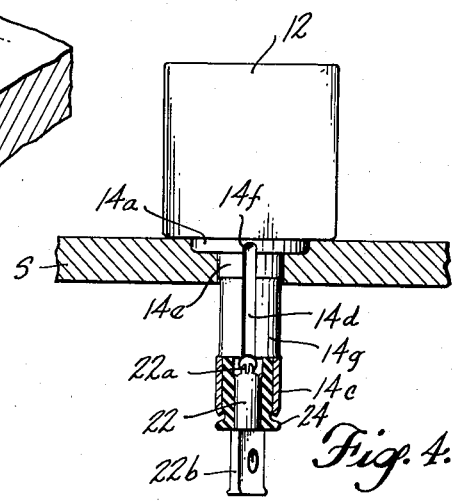
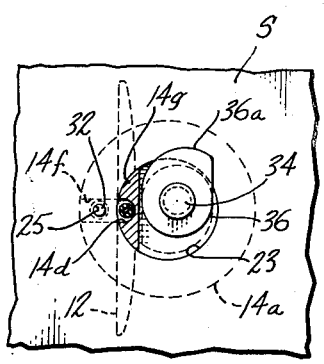
INVENTOR.
ROY H. ANDERSON
JAMES W. McKEE
BY
ATTORNEYS

United States Patent Office 2,764,373
Patented Sept. 25, 1956

2,764,373

HEATED VORTEX GENERATOR

Roy H. Anderson and James W. McKee, Bellevue, Wash., assignors to Boeing Airplane Company, Seattle, Wash., a corporation of Delaware Application May 18, 1953, Serial No. 355,826

9 Claims. (Cl. 244—130)

This invention relates to vortex generators designed for improving the boundary layer conditions adjacent fluid swept surfaces, and especially to devices of that type as applied to the airfoils of high speed aircraft. A vortex generator unit efficient for such applications is herein illustratively described by reference to its presently preferred form, but it will be understood that certain changes and modifications therein may be made without departing from the underlying or characterizing features comprising the invention.

The theory of vortex generators for controlling the boundary layer conditions adjacent an airfoil surface is well known in terms of the basic aerodynamics involved. In essence a plurality of relatively small externally projecting vanes mounted on the upper surface of a wing, for instance, at intervals along the wing span, with the individual vanes set perpendicularly to the surface and at a small angle to the rearwardly proceeding air stream create vortices which swirl in planes parallel to the surface and materially reduce the boundary layer, i. e. reduce the separation of the main air stream from the wing surface. The result is to reduce the drag and increase the lift of a wing so that a jet plane, for instance, may achieve still higher speeds when flown in the range of speed achievable at high altitudes with that type of propulsion.

However, in the application of vortex generators to jet airplanes it was observed initially that the abrupt projection of the vanes out of the smooth contour of the wing surface caused a rather extreme tendency for icing on and around the vanes. This tendency became as great or greater than that normally present at the wing's leading edge, apparently because of the higher velocity of the air stream in moving over the curved upper surface of the wing and impinging the vanes. The resulting ice formations greatly reduce the effectiveness of the vortex generators for their intended purpose. This problem proved to be particularly serious because the icing tendency became acute at those altitudes and speeds at which the potential beneficial effects of the vortex generators approached a significant magnitude. The concept of individually heating the many small vortex generator vanes on an airplane wing so as to eliminate this icing condition evolved from those studies and constitutes the basis of the present invention.

With the foregoing in view, the present invention provides an efficient vortex generator unit applied to high speed aircraft and overcoming the described icing problem by heating the units individually. More specifically, the invention provides a vortex generator vane and vane mount construction permitting each individual generator vane to be separately heated by means confining the heat largely to the vane surfaces where it is needed so as to minimize the total heat energy requirements. A related purpose is to accomplish this result without complicating the problem of mounting the individual vanes, and without imposing limitations on the possible placement areas of the vanes on a wing, nor of requiring modified wing construction.

Another object of the present invention is a heated vortex generator unit adapted for installation in removable manner on an airplane wing from the exterior side of the wing surface without benefit of special tools or jigs.

Another object of the invention is a heated vortex generator unit capable of being mounted on the exterior of an airplane wing to be supported entirely from the sheet metal skin of the airfoil without weakening the skin, loosening, or of changing angle with relation to the direction of the air stream.

A related object is an electrically heated vortex generator unit having provisions for making electrical heating connections to the unit by assembly operations conducted from the exterior of the wing even though such connections are made to electrical conductors running through the wing interior from the airplane's electrical system. Such connections may also be easily removed in order to effect replacement or repairs of individual units.

Other objects include a simple and rugged construction for such units, ease of removal and replacement, compactness, lightness of weight, and a type of construction permitting a number of standardized or similar units to be quickly mounted at any of various different locations on a wing, each at a desired angle to the air stream according to the effects desired therefrom.

With these and other objects in view the invention comprises certain novel features and aspects and possesses certain additional advantages as will become apparent from the following description of the illustrated form thereof by reference to the accompanying drawings.

Figure 1 is a simplified perspective view of a fragmentary section of wing carrying three vortex generator units.

Figure 2 is an enlarged perspective view of an individual vortex generator unit installed.

Figure 3 is a sectional elevation view taken on line 3—3 in Figure 2.

Figure 4 is a sectional elevation view taken at right angles to the view in Figure 3, namely on line 4—4 in Figure 3.

Figure 5 is a bottom view of an installed vortex generator unit as seen from the wing interior, the view illustrating the locking nut in locked position by solid lines and in unlocked position by dotted lines.

With reference to the drawings, a fragmentary portion of an airplane wing W is illustrated diagrammatically in Figure 1 upon the upper surface of which is mounted a group of three vortex generator units 10 of which there may be many similar such units on a wing. In order to achieve the desired vortex action, the stub airfoils or vanes 12 comprising the vortex generators are mounted in respective planes approximately perpendicular to the wing surface and disposed at a slight angle to the direction of the air stream so as to deflect the air into eddies which swirl in a plane parallel to the wing surface.

In accordance with the preferred form of the present invention the individual vanes 12 are formed as hollow shells of airfoil external form (i. e. thin and wide in cross section in a plane normal to the longitudinal axis of the elongated mounting element to be described) within the respective chambers of which electrical resistance heating elements are incorporated for individual heating of such vanes. In the illustrated embodiment the hollow vane 12 is formed of sheet metal and is soldered, brazed or otherwise secured to the flat head 14a of an elongated mounting element in the form of the stud 14 constituting the base or principal support for a vortex generator unit. In a typical case the vane 12 may be about one inch square on a side and the head of the stud about three-quarters of an inch in diameter.

A grid of electrical resistance wire 16 wound on a flat insulating card 18 fits snugly inside the hollow vane 12 in order to impart heat distributed over most of the surface are of the vane but confined largely thereto, when electric current is passed through the resistance wire from the electrical power supply system of the airplane. The general plane of the vortex generator vane 12 upstanding from the circular stud head 14a is preferably offset from the center of the head for a reason to be described, and a hole 14b in the head at the base of the vane is provided in order to pass the insulated electrical conductor 20 by which one end of the electrical resistance wire 16 is supplied with electric current. The opposite end of this wire is conveniently grounded as by soldering it to the sheet metal of the vane itself. The electrical conductor 20 extends through this opening and along the base of a protective recess or groove 14d in the side of the stud so that the wire does not project laterally beyond the side or shank of the stud 14. The lower end of this wire extends to a binding post 22 and is crimped in the upper terminal 22a thereof. The cylindrical body or shank of this binding post is received and held in an insulating grommet 24 permanently retained in the lower tubular end 14c of the stud 14. The flat lower terminal 22b of the binding post has a threaded aperture which receives a securing screw 26 for the lug 28 on the end of an electrical conductor 30 connected to the power supply circuit of the airplane.

Immediately beneath the stud head 14a the stud shank 14e is cylindrical and fits in the hole 23 formed in the sheet metal skin S of the airfoil. This hole is counterbored to receive the stud head 14a so that the end face thereof carrying the vane 12 will be flush with the surface of the airfoil (Figure 3). The width of the lower terminal 22b of the binding post 22 is less than the diameter of the shank 14e; moreover, no part of the stud below this shank nor of the screw 26 or lug 28 projects beyond the outer radius of the shank so as to prevent slipping the assembled unit into place through the hole in the airfoil skin with the conductor 30 connected to the terminal 22b. Consequently it becomes possible to make the electrical connection between an energizing conductor 30 inside the wing and associated with the power supply system of the airplane actually before the vortex generator unit is mounted in the position shown in Figures 2 to 5. This may be done by having the end of the conductor 30 carrying the lug 28 to project outward through the hole 23 so as to be accessible from the exterior of the wing after the airfoil skin section is riveted in place on the wing structure C. It is therefore a comparatively simple matter to complete the heating circuit for the resistance wire 16 before or when the vortex generator unit is installed on the airplane wing.

At the base of the counterbore to the stud hole 23 a smaller hole 25 is drilled which snugly receives the round-headed rivet or pin 32 which is driven into place immediately prior to insertion of the stud 14 into the hole 23. The underside of the stud head 14a has a radial groove or notch 14f designed to receive the head of this pin and to contact the same. The pin 32 serves two purposes, one being to establish and fix the angle of the vane 12 with respect to the air stream. The second purpose of the pin 32, which is preferably of aluminum or other electrically conductive metal, is to establish a good ground contact between the stud head 14a closely adjacent to the grounded end (not shown) of the electrical resistance wire 16, and the sheet metal airfoil skin S so as to form a low-resistance ground connection for the electrical heating circuit of the wire 16 inside the vane 12.

In order to hold the vortex generator vane 12 securely in its established position on the wing, the headed end of the stud 14 has an off-center longitudinal bore which receives the machine screw 34 carrying a special locking nut 36. This bore is offset laterally from the base of the vane 12 for access to the screw head by a screw driver and in order to permit the specially shaped nut 36 to pass through the hole 23 in a certain rotated position of the nut. The head of this fastening screw is countersunk in the stud head 14a for obvious reasons, and the lower end of the screw is peened over in order to prevent the nut 36 from dropping off in the event the screw is turned too far in one direction. The shank of the stud 14 is notched or cut away to form a large side opening 27 accommodating the screw and nut. The remaining or solid side of the shank portion 14g interconnecting the tubular lower end 14c and the upper shank 14e serves as a stop for the nut 36 limiting its range of rotation relative to the stud.

With reference to Figure 5 it will be seen that the top of the otherwise cylindrical nut 36 has a radially projecting lobe 36a which is graduated in radial width increasingly clockwise as viewed in Figure 5, and extends circumferentially over two or three radians. The lobe 36a is formed such that in the maximum clockwise-rotated position thereof, as illustrated in dotted lines in Figure 5, it will pass with the stud through the hole 23 in the wing skin S, due to the eccentricity of the screw relative to the stud, in order to seat the stud head 14a in the counterbore flush with the wing surface. When the screw 34 of right-hand threads is then turned counterclockwise (as seen in Figure 5) by means of a screw driver from the exterior of the wing, the nut, loose on the screw, first rotates clockwise with the screw, and the lobe 36a commences to lap progressively under the wing skin S. Continued rotation of the screw 34 in the same direction draws the upper face of the lobe tightly against the wing skin and establishes a rigid connection to the wing preventing withdrawal or any movement of the stud 14 relative to the wing. The final position of the nut's lobe 36a may be its limit position in which it abuts the solid side of the stud 14, or may be that illustrated in Figure 5 wherein friction of the lobe against the wing skin has prevented further counterclockwise rotation of the nut 36 as the screw is being cinched tight.

In order to remove the vortex generator unit from the wing, it is merely necessary to loosen the screw 34 by counterclockwise rotation thereof and the lobe 36a will be swung into its dotted line position shown in Figure 5 wherein it is retracted within the outline of the stud and permits bodily withdrawal of the stud, carrying the wire 30, through the hole 23 in the wing. The binding terminal screw 26 may then be loosened, in order to disconnect the wire 30 from the vortex generator unit 10 for replacement or repair of the unit if desired.

It will be seen, therefore, that the making and breaking of electrical connections of the heating element in the vortex generator vane with the airplane's electrical system and also the physical mounting and dismounting of the vortex generator unit may be accomplished with ease entirely from the exterior of a completely fabricated airplane wing. Moreover, the incorporation of individual electrical resistance heating elements in each vortex generator vane prevents formations of ice on the surface of the vane or adjacent the base thereof with minimum expenditure of electrical energy and without necessity of modifying the wing construction to receive heating ducts or pipes, etc. The mounting stud 14 serves the multiple purpose of a base for the vane 12, a means carrying the connecting elements for the electrical conductors for energizing the heating element in the vane, and a means by which the unit as a whole is conveniently secured removably to the skin of an airfoil at any desired location thereon.

We claim as our invention:

1. In combination with an airfoil having a surface skin, an electrically heated vortex generator unit mounted on said airfoil skin, comprising a flat headed stud, a relatively flat hollow vane mounted on the stud head substantially perpendicularly to the plane thereof, an electric resistance wire heating element received in the hollow of said vane, electrical connections to said element including an insulated conductor carried by and extending through the stud, and means on the stud removably securing the same to the airfoil skin.

2. The combination defined in claim 1, wherein the airfoil skin is bored and counterbored to receive the stud and stud head, respectively, the vane is mounted eccentrically of the stud, and wherein the stud head has an off-center longitudinal bore on the side thereof opposite the vane, and the securing means comprises a screw passing through said longitudinal bore, and a lobe nut threaded on the screw to project laterally into overlapping relation to the skin and to be rotated into a different position permitting retraction of the stud from such bore.

3. A vortex generator unit mountable on the skin of an airplane wing comprising an elongated mounting element, a head formed at the upper end of said elongated mounting element, said head having a longitudinal bore therethrough and an upstanding vane formed thereon, a cross-section of said vane in a plane normal to the axis of said elongated mounting element having relatively small thickness and relative large width, said vane having a chamber formed therein, an electrical heating element in said chamber, electrical connecting means for energization of said heating element carried by said elongated mounting element, and fastener means received in said bore adapted to secure the vortex generator on an airplane wing.

4. The vortex generator unit defined in claim 3, wherein the elongated mounting element is of generally tubular form having a side portion removed at the upper end of such mounting element to form a projection opening, and wherein the fastener means comprises a screw received in the mounting element bore, said bore being eccentric to the mounting element, and a lobed fastener nut threaded on said screw and having a side lobe thereon projecting laterally therefrom through said projection opening to engage the inner side of the skin of an airplane wing on which said vortex generator unit is mounted, the lobe on said nut being movable into non-projecting position by rotation of said nut on said screw into a predetermined angular position thereon.

5. The vortex generator unit defined in claim 4, wherein the electrical connecting means comprise a hollow insulating head carried by the lower end of the tubular mounting element, an electric terminal element retained in said head and having a terminal lug on its lower end and a terminal post on its upper end, said mounting element having a guide passage extending longitudinally therein, an insulated electric conductor extending lengthwise through said guide passage, said electric conductor being connected at one end to said terminal post and at its opposite end to one end of the electrical heating element, the opposite end of said heating element being electrically grounded to the head to make ground contact with the airplane wing skin.

6. The vortex generator unit defined in claim 5, and combined anti-rotation and ground contact means for the head of the generator unit mounting element, said ground contact means including a headed pin insertable inwardly through a hole in the skin of the airplane wing directly beneath said mounting element head, with the head of said pin projecting outwardly from said skin, the underside of said mounting element head having a recess formed therein with sides extending generally radially in relation to said mounting element head and spaced apart by approximately the diameter of the pin's head to receive the head of said pin therebetween and thereby prevent rotation of said head about the longitudinal axis of the mounting element, localized pressure on said pin's head between said mounting element head and the airplane wing skin with the generator unit mounted thereon being effective to establish a low resistance electrical ground contact between such skin and said mounting element head.

7. A vortex generator unit comprising a mounting element adapted for insertion through a counterbored mounting hole in the skin of an airfoil structure, a relatively thin and substantially flat head formed as an enlargement on the outer end of said mounting element to seat in the counterbore in the airfoil structure skin and become substantially flush with the outer surface of such skin, said head having an upstanding vortex generator vane formed thereon, a cross section of said vane in a plane normal to the axis of said mounting element, hence substantially parallel to the surface of the airfoil structure skin in which the mounting element is inserted, having relatively small thickness and relatively large width, said vane having a chamber formed therein, an electrical heating element in said chamber, electrical connecting means for energization of said heating element carried by said mounting, and means for removably securing said headed mounting element to the airfoil structure skin.

8. The vortex generator unit defined in claim 7, wherein the mounting element is of generally cylindrical form and the removable securing means comprises a screw inserted through a bore formed in the headed mounting element parallel to and offset from the axis thereof and an eccentrically formed nut threaded on said screw beneath the mounting element head, said nut being rotatable with the screw between a first limit position wherein the same lies wholly within the extended generally cylindrical surface configuration of the mounting element and a second position wherein one side of said eccentrically formed nut projects laterally beyond said surface configuration to lap beneath the interior surface of the airfoil structure skin and thereby prevent retraction of the mounting element from the bore thereof, the mounting element having thereon angularly spaced stops engageable by the nut in the respective limit positions thereof.

9. A demountable vortex generator unit comprising a base element insertable through an opening in the skin of an airplane, said base element having an outer end portion of substantially flat configuration formed to lie substantially flush with such airplane skin, an upstanding vortex-generating vane formed on the exterior face of said base element outer end portion, said vane having a cavity and said element having a passage therethrough communicating with said cavity, an electrical heating element received in said cavity, an electrical conductor connected to said heating element and extending therefrom through said passage, hence through the airplane skin opening, said conductor being adapted for connection to an electrical circuit to energize said heating element, and removable fastener means carried by said base element for securing the same in fixed position relative to the airplane skin.

References Cited in the file of this patent

UNITED STATES PATENTS

| | | |
|---|---|---|
| 1,846,468 | Benson | Feb. 23, 1932 |
| 2,026,482 | Mattioli | Dec. 31, 1935 |
| 2,041,793 | Stalker | May 26, 1936 |
| 2,403,247 | Sullivan | July 2, 1946 |
| 2,479,992 | Woods | Aug. 23, 1949 |
| 2,558,816 | Bruynes | July 3, 1951 |
| 2,680,583 | Davis | June 8, 1954 |

FOREIGN PATENTS

| | | |
|---|---|---|
| 468,294 | Canada | Sept. 26, 1950 |
| 537,238 | Great Britain | June 13, 1941 |
| 547,261 | Great Britain | Aug. 20, 1942 |
| 993,187 | France | July 18, 1951 |

OTHER REFERENCES

"Machinery," British publication, October 23, 1947, pp. 456–459.